United States Patent [19]

Newman

[11] Patent Number: 4,712,778

[45] Date of Patent: Dec. 15, 1987

[54] HELICAL SPRING HOLDER ASSEMBLY

[75] Inventor: Wyatt S. Newman, New York, N.Y.

[73] Assignee: North American Philips Corporation, New York, N.Y.

[21] Appl. No.: 332,993

[22] Filed: Dec. 21, 1981

[51] Int. Cl.$^4$ .............................. F16F 1/06; F16F 1/12
[52] U.S. Cl. .................................... 267/170; 267/179; 267/286
[58] Field of Search .............. 267/170, 171, 172, 173, 267/174, 175, 176, 177, 178, 179, 180, 166, 167, 154, 168, 155, 156, 157, 169, 60, 20, 61, 57, 58, 59, 4

[56] References Cited

U.S. PATENT DOCUMENTS

| | | | |
|---|---|---|---|
| 2,754,112 | 7/1956 | Pouell | 267/60 |
| 3,141,660 | 7/1964 | Clarke et al. | 267/615 X |
| 3,169,757 | 2/1965 | Röder et al. | 267/170 X |
| 4,362,294 | 12/1982 | Schobbe et al. | 267/170 |

FOREIGN PATENT DOCUMENTS 485251 12/1975 U.S.S.R. ............................. 267/166

Primary Examiner—Douglas C. Butler
Attorney, Agent, or Firm—Robert J. Kraus

[57] ABSTRACT

A helically-threaded spring holder on which a helically wound spring is mounted has a groove formed in one side of the thread at the end where the spring engages the spring holder. The groove relieves the portion of the side in which it is formed from restricting the spring against axial movement during deflection of the spring. The circumferential length of this groove is chosen to establish the number of spring coils which can be deflected without contacting the side of the thread. The end of the thread is also made rigid to prevent flexing thereof during maximal elongation of the spring.

8 Claims, 11 Drawing Figures

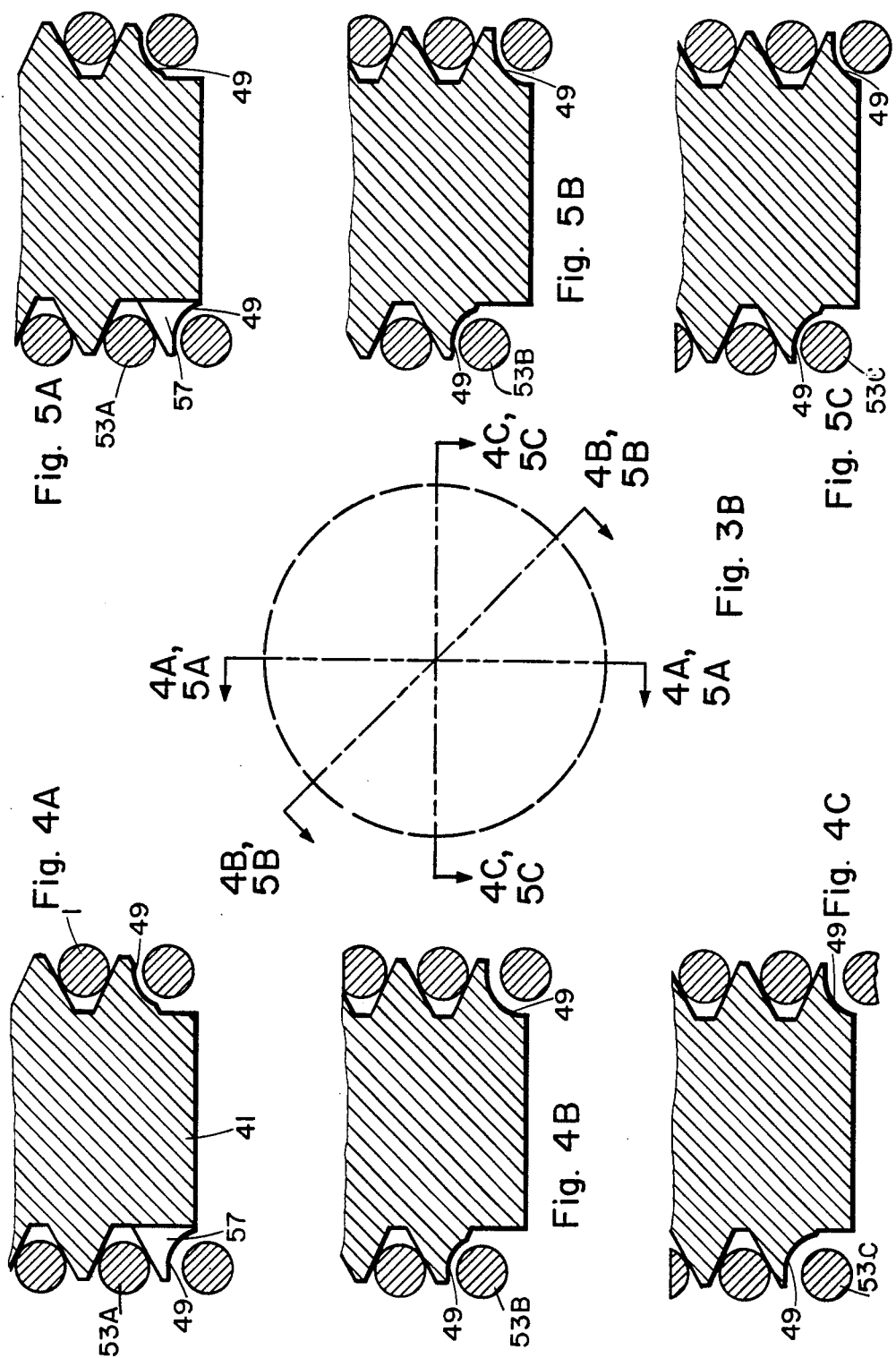

HELICAL SPRING HOLDER ASSEMBLY

The invention described herein was made in the performance of work under NASA Contract No. 5-25172 and is subject to the provisions of Section 305 of the National Aeronautics and Space Act of 1958 (72 Stat. 435; 42 U.S.C. 2457);

BACKGROUND OF THE INVENTION

1. Field of the Invention

This invention relates to helical spring assemblies and, in particular, to a spring holder utilized in such assemblies, which has a helically-threaded portion onto which a helically-wound spring can be mounted. The thread of the spring holder has a tension bearing side against which a mounted spring bears when it is in tension, and a compression bearing side against which the spring bears when it is in compression. Typically, the ends of a spring are mounted on a pair of axially-spaced spring holders which are utilized as a means for securely attaching the spring to apparatus such as reciprocating devices, where the spring is used to absorb vibrations.

The tensile and compressive forces produced by a spring mounted on a holder are a function of the number of spring coils which are active (free to move) after mounting. Expressions defining the magnitudes of forces produced by helical springs are well known. For example, see A. M. WAHL, MECHANICAL SPRINGS, p. 56 (Second Edition 1963) where the expressions listed below as equations 1 and 2 are presented.

$$P = k\delta \quad \text{(Eqn. 1)}$$

$$k = Gd^4/8D^3n \quad \text{(Eqn. 2)}$$

In equation 1, P represents the tensile or compressive force produced by a spring when it is elongated or compressed, k is the spring constant and $\delta$ is the deflection from its relaxed length which the spring is elongated or compressed. The spring constant k is further defined by equation 2 where G is the shear modulus, d is the cross-sectional diameter of the spring wire, D is the diameter of the spring coils and n is the number of active coils. By substituting equation 2 into equation 1, the following equation is derived:

$$P = (Gd^4/8D^3n)\delta \quad \text{(Eqn. 3)}$$

2. Description of the Prior Art

The thread on a conventional spring holder follows the pattern of a regular helix and terminates in a planar-shaped end of the spring holder. When a spring is mounted on the spring holder, the number of active coils in tension $n_t$ differs from the number of active coils in compression $n_c$, causing different tensile and compressive spring constants. Thus there is a difference in the tensile force $P_t$ and the compressive force $P_c$ produced by the spring for tensile and compressive deflections of equal magnitude. The number of active coils in tension is greater than the number of active coils in compression, because the first coil engaging the thread of the spring holder contacts the compression bearing side of the thread before it contacts the tension bearing side, and thus a portion of this coil which is not restricted against elongation is restricted against compression. This difference in the tensile and compressive spring constants is significant unless a relatively large number of coils are active, and in some applications it can adversely affect operation of the spring. For example, if the spring is mounted in a reciprocating device, for harmonically absorbing vibration of parts moving at the reciprocating frequency of the device, the spring might be ineffectual and the unequal forces produced thereby could even cause an increase in vibration by unbalancing the moving parts.

In other applications it is desirable to arbitrarily establish predetermined ratios of the tensile and compressive forces produced by a mounted spring for specific deflections $\delta$ of the spring. With conventional spring holders this can not be done, however, because the ratio of the number of coils in tension and in compression cannot be arbitrarily established.

Conventional spring holders also tend to cause the tensile force produced by the spring to change non-linearly with respect to deflection during maximal elongations of the spring. It is known that this non-linear force is a result of the combined tensile force produced by the spring, which is itself designed for linear operation, and the counteracting force applied to the spring by the thread of the spring holder. The non-linearity is caused by flexing of the thread near its end, where the spring engages the spring holder. The end of the thread will yield and eventually fatigue if it is continually subjected to such flexing.

SUMMARY OF THE INVENTION

An object of the invention is to provide a helical spring holder which is constructed such that the relative magnitudes of the tensile and compressive forces produced by a spring mounted thereon can be arbitrarily chosen.

Another object of the invention is to provide a helical spring holder which is constructed for cooperation with a spring to be mounted thereon such that the force produced by a mounted spring changes linearily over the entire range of deflection at which the spring is operated.

In accordance with the invention a groove is formed in a portion of at least one side of the spring holder thread over a predetermined circumferential length, starting at the end of the thread where the spring engages the spring holder. The groove relieves the spring from restriction against axial movement by this portion of the side. The groove is made sufficiently deep to prevent contact between the spring and the portion of the side in which it is formed, during normal deflection. By appropriately selecting the side of the thread in which the groove is formed, and the length of the groove, the ratio of the number of coils in tension to the number of coils in compression can be arbitrarily established at a predetermined value which is greater than, equal to or less than unity. In a preferred embodiment of the invention the groove is formed in the compression bearing side of the thread and the length of the groove is chosen such that the number of active coils in tension is equal to the number of active coils in compression.

In applications where a mounted spring is to be operated at maximal elongations, which would ordinarily cause flexing of the end of the thread where the spring engages the spring holder, rigid means is provided at the end. In the preferred embodiment rigidity is provided by abruptly terminating the end of the thread, such that the end has sufficient body to resist flexing during maximal elongation.

BRIEF DESCRIPTION OF THE DRAWING

FIG. 3B is a schematic illustration defining the angular relationships of specific cross-sectional views of a spring holder shown in FIG. 3A, as viewed from the top of the spring holder.

FIGS. 4A, 4B, 4C are the cross-sectional views of the spring holder taken at the angles defined by FIG. 3B and showing a mounted spring in its relaxed state.

FIGS. 5A, 5B, 5C are cross-sectional views of the spring holder taken at the angles defined by FIG. 3B and showing the spring in a compressed state.

DESCRIPTION OF THE PREFERRED EMBODIMENT

Figure 1:
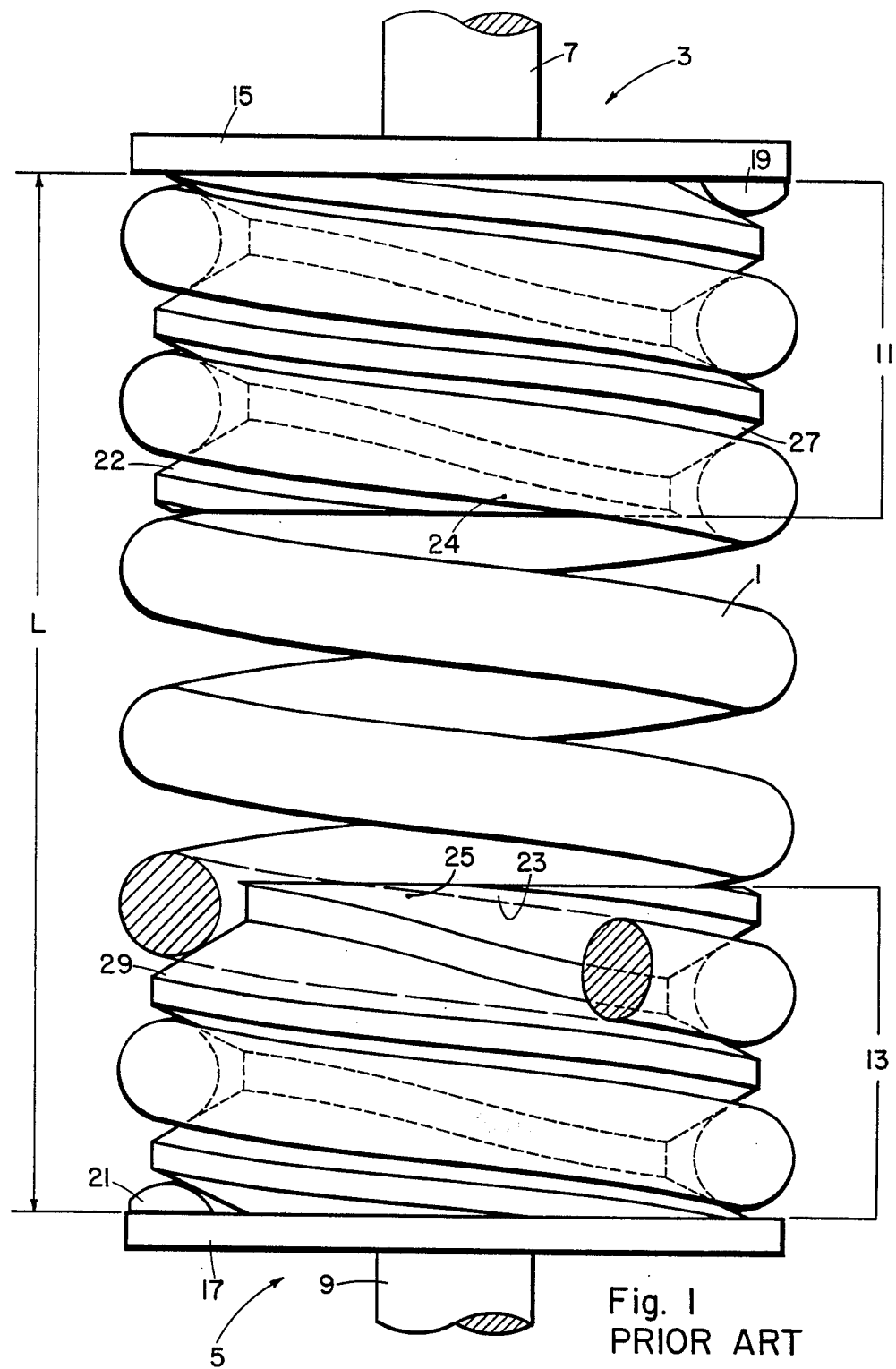
FIG. 1 is a perspective view of a prior art helical spring holder assembly.

The afore-mentioned difficulties with prior art helical spring holders can be better understood by referring to FIG. 1 which illustrates a conventional helical spring assembly including a spring 1 mounted on helical spring holders 3, 5. The respective spring holders 3, 5 comprise attachment means 7, 9 for attaching the spring holder to the apparatus in which the assembly is used, threaded portions 11, 13 on which the spring is mounted, and base portions 15, 17 against which ends 19, 21 of the spring abut.

The spring 1 is shown at its relaxed length L in FIG. 1. The relaxed spring 1 engages tension bearing sides 22, 23 of the conventional spring holders at points 24, 25, located near the end of the threads. However, it engages compression bearing sides 27, 29 before engaging the tension bearing sides. Thus, a larger number of coils are active in tension than in compression.

Figure 2:
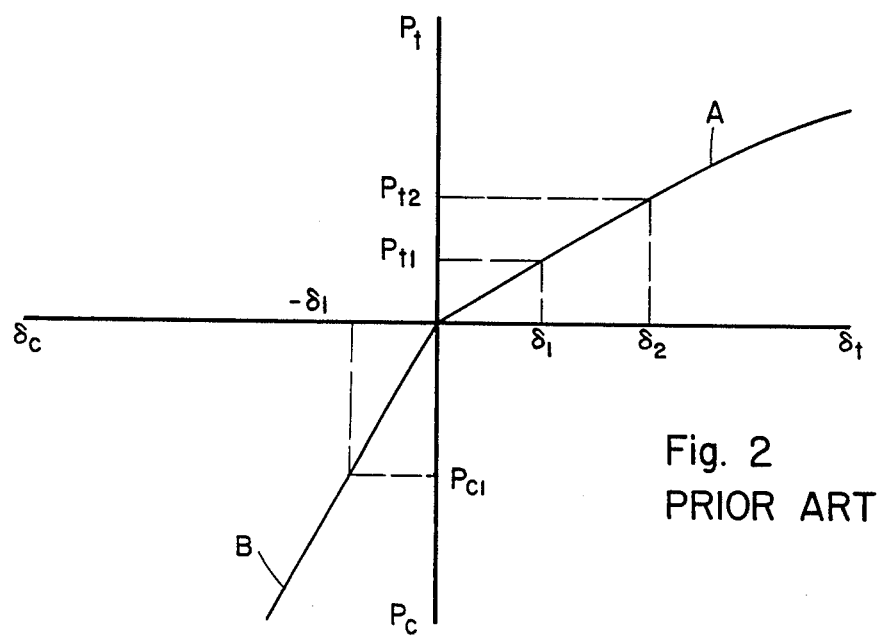
FIG. 2 is a force versus deflection graph for the spring holder assembly of FIG. 1.

The effect of the difference between $n_t$ and $n_c$ on the tensile force $P_t$ and the compressive force $P_c$ produced by the spring 1 is illustrated graphically in FIG. 2 by curves A and B, respectively. Because the force P produced by a spring is inversely proportional to the number of active coils n, as is demonstrated by equation 3, the tensile force $P_{t1}$ produced by spring 1 for an elongational deflection $\delta_1$ from the relaxed length L is smaller than the compressive force $P_{cl}$ produced for a corresponding compressive deflection $-\delta_1$.

Again referring to FIG. 2, it can be seen that beyond an elongational deflection $\delta_2$ curve A becomes non-linear. It is at this elongation that a tensile force $P_{t2}$ which is sufficient to cause flexing of the threads at relatively thin portions near the points 24, 25 has been applied to the spring holders. This non-linearity is undesirable if operation of the spring at forces in excess of $P_{t2}$ are contemplated because it is evidence of potential yielding and fatigue of the thin portions of the threads.

Figure 3A:
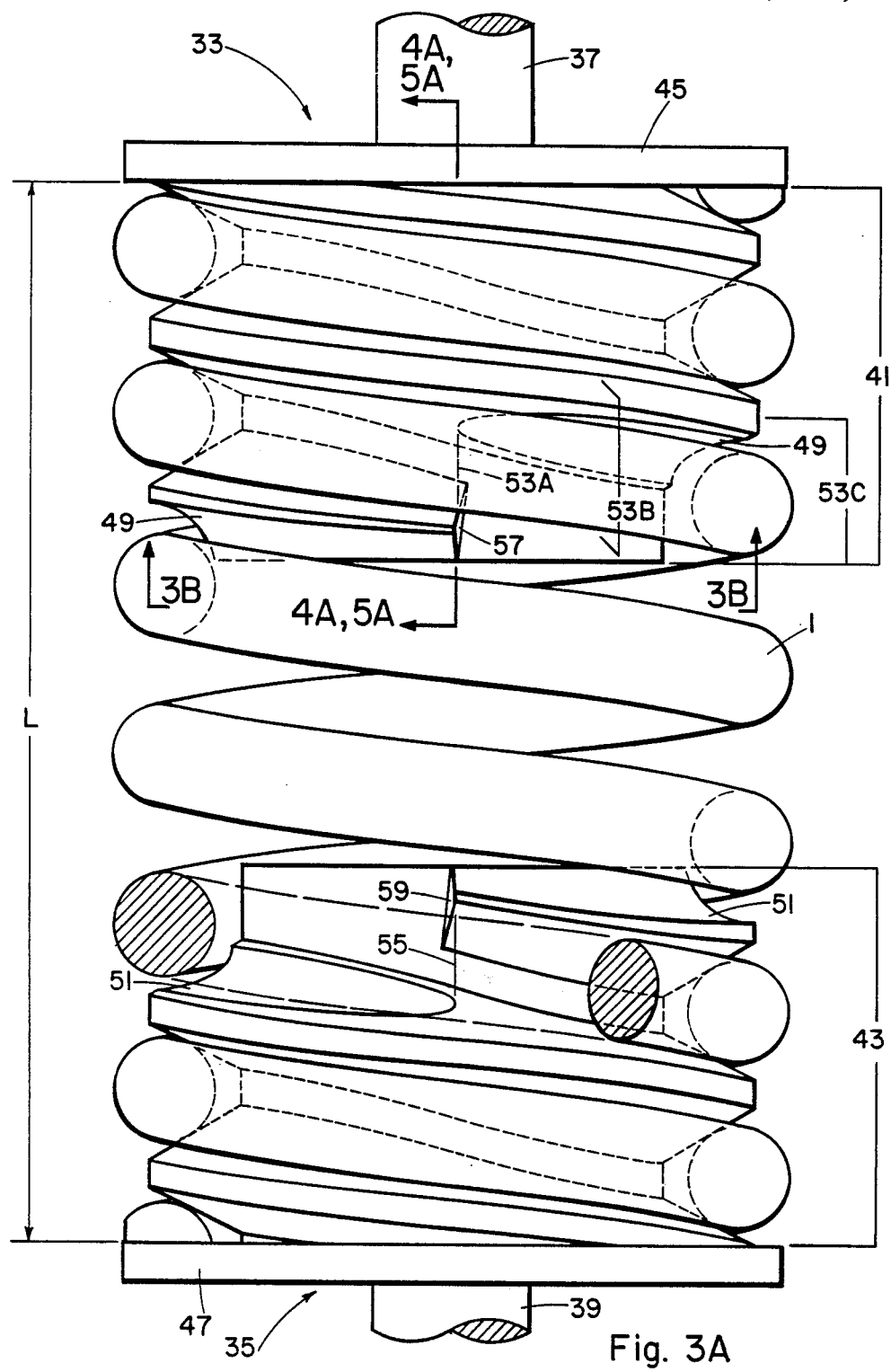
FIG. 3A is a perspective view of a preferred embodiment of a helical spring holder assembly constructed in accordance with the invention.

FIG. 3A shows a spring holder assembly constructed in accordance with the invention in which the spring 1 is mounted on spring holders 33, 35. The spring holders 33, 35 comprise attachment means 37, 39, threaded portions 41, 43 and base portions 45, 47, similar to those of the prior art spring holders. However, grooves 49, 51 have been formed in the compression bearing sides of the threads of the respective spring holders 33, 35. These grooves are formed in the threads starting at the ends of the threads where the spring 1 engages the spring holders, and each groove has a circumferential length, measured along its respective thread, of one full turn. The grooves must be sufficiently deep to prevent bottoming of the spring therein during the largest expected compressive displacement of the spring from its relaxed length L. For example, a spring holder assembly having three active coils in compression ($n_c=3$) and a maximum compressive deflection ($\delta_c$max) of 0.60 inch must have a groove at least $\delta_c$max/$n_c$ =0.20 inch deep at the locations were the spring would first make contact.

Preferably the grooves should have the same radius of curvature as the cross section of the spring wire, to minimize the amount of material which must be removed from the threads. In practice the radius of curvature of the groove is made slightly larger than that of the spring wire to allow for asymmetrical positioning of the spring wire relative to the groove. For example, a groove radius of 0.30 inch has been used for a spring wire having a radius of 0.25 inch.

Figure 6:
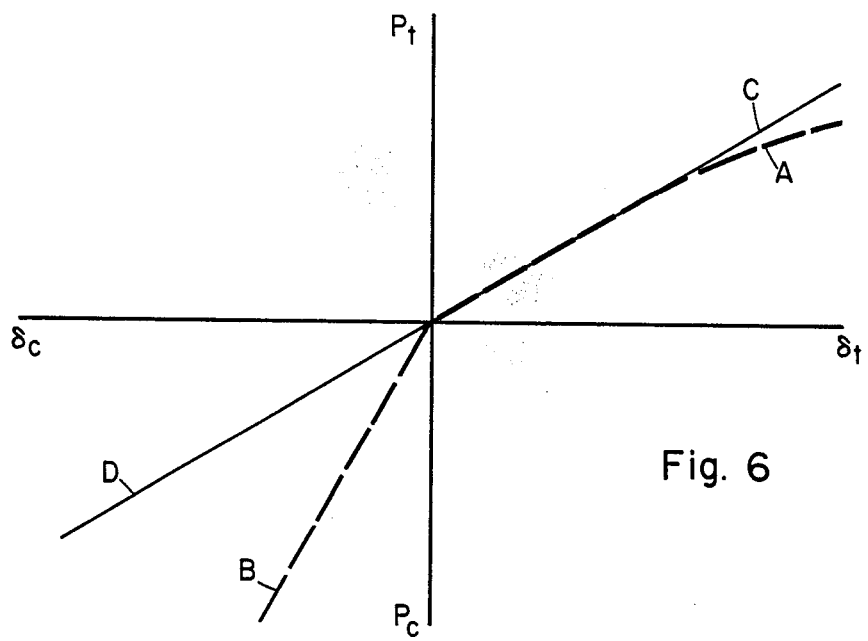
FIG. 6 is a force versus deflection graph for the spring holder assembly of in FIG. 3A.

Because of the grooves 49, 51, the spring simultaneously comes into contact with both the tension bearing side and the compression bearing side of each spring holders thread, at respective locations 53A, 55. Thus, the number of active coils in tension $n_t$ is equal to the number of active coils in compression $n_c$ and the tensile and compressive forces produced by the spring are equal for tensile and compressive deflections of equal magnitude. This relationship is represented by curves C and D in FIG. 6. Curves A and B from FIG. 2 are also shown in FIG. 6 (as broken lines) for comparison with the curves C and D.

The number of active coils does not change as the spring is elongated or compressed. This can be readily seen by referring to FIGS. 4A, 4B, 4C and 5A, 5B, 5C. FIGS. 4A, 4B, 4C are cross sectional views of a portion of the spring and adjacent thread surfaces of spring holder 33, taken in the directions indicated in FIG. 3B, when the spring is relaxed. Cross sections of the first coil of spring wire engaging the thread are designated 53A, 53B and 53C in the respective views. Note that at coil cross section 53A (FIG. 4A) the spring is restricted from axial movement in both directions, while at coil cross sections 53B (FIG. 4B), 53C (FIG. 4C), and thus at all other locations along the groove 49, the spring can be elongated with total freedom and can be compressed as far as the groove 49 will permit. As can be, seen in FIGS. 5A, 5B, 5C which shows the spring at maximum compression, the depth of the groove is sufficient to prevent the spring from contacting the thread.

Note that by changing the lengths of the grooves in the compression bearing sides of the spring holder threads it is also possible to obtain compressive force $P_c$ versus compressive deflection $\delta_c$ characteristics represented by curves other than D. Characteristics represented by curves falling between curves B and D can be obtained by making the circumferential length of the grooves less than one turn. Characteristics represented by curves falling between curve D and the horizontal axis can be obtained by making the circumferential length of the grooves greater than one turn. Thus a range of compressive force characteristics can be obtained by merely changing the lengths of the grooves in the compression bearing sides of the threads in the spring holders.

It is also possible to change the tensile force characteristic from that represented by curve C, by providing grooves in the tension bearing sides of the threads on the spring holders. This increases the number of active coils in tension and thus decreases the tensile force produced for any given tensile deflection $\delta_t$. By changing the lengths of these grooves, force versus deflection characteristics represented by curves falling between curve C and the horizontal axis can be obtained.

In addition to the formation of grooves in the threads, the spring holders of FIG. 3A differ from conventional spring holders in another important respect. The rigidity of the thread at the end where the spring engages each spring holder is made sufficiently great to prevent flexing at maximal elongations of the spring. This is done by abruptly terminating the threads in cross-sectional surfaces 57, 59 to provide sufficient thread body at the end to resist flexing.

Alternative means can also be provided for preventing flexing of the ends of the threads. For example, a radially-extending pin can be provided in each spring holder at the end of the thread to reinforce the point where the spring engages the spring holder.

By reinforcing the ends of the threads the force versus deflection characteristics of the mounted spring is linearized, as can be seen in FIG. 6 by comparing curve C for the spring holder assembly of FIG. 3 with curve A for the conventional spring holder assembly of FIG. 1. This linearity demonstrates the resistance of the ends of the threads to flexing. Both the linearity and the close correspondence of the tensile force $P_t$ and compressive force $P_c$, for equal deflections, was verified by a test of the exemplary spring holder assembly. The test results are tabulated in Table 1.

TABLE 1

| $\delta$ (mils) | $P_t$ (lbs) | $P_c$ (lbs) | DIFFERENCE (%) |
|---|---|---|---|
| 0 | 0 | 0 | — |
| 50 | 21.2 | 21.2 | 0 |
| 100 | 42.2 | 42.3 | .2 |
| 150 | 63.2 | 63.5 | .5 |
| 200 | 84.6 | 85.1 | .6 |

Note that the tensile and compressive forces remain within 1% of each other for identical tensile and compressive deflections $\delta$.

Although the invention has been explained by use of an exemplary embodiment, it is recognized that various modifications can be made without departing from the scope of the invention as defined by the appended claims. For example, the spring holder assembly need not include pairs of identical spring holders as has been disclosed, but can include a single spring holder constructed in accordance with the invention, and a conventional spring holder. Any non-uniformities in the tensile and compressive forces, which would otherwise be caused by the conventional spring holder, can be compensated for by appropriately designing the grooved spring holder in accordance with the principles of the invention.

I claim:

1. A spring assembly comprising at least one helically-threaded spring holder and a helically-wound spring mounted thereon, the thread on the spring holder having a tension bearing side against which the spring bears when it is in tension and a compression bearing side against which the spring bears when it is in compression, characterized in that the spring holder has a groove formed in a portion of at least one of said sides of its thread over a predetermined circumferential length starting at the end of the thread where the spring engages the spring holder, said groove relieving the spring from restriction against axial movement by said portion of the side, said length being chosen to establish a predetermined ratio of the number of active spring coils in tension to the number of active spring coils in compression.

2. An assembly as in claim 1 where the spring holder includes rigid means, located at the end of the thread where the spring engages the spring holder, for preventing flexing of said end during maximal elongation of the spring.

3. An assembly as in claim 1 where the thread on the spring holder abruptly terminates at the end where the spring engages the spring holder, such that the end of the thread has sufficient body to resist flexing during maximal elongation of the spring.

4. An assembly as in claim 1, 2 or 3 comprising two axially-aligned spring holders, each having one of said grooves formed in each spring holder in the compression bearing side of its thread, the lengths of said grooves being chosen such that the number of active spring coils in tension is equal to the number of active spring coils in compression.

5. A helically-threaded spring holder for mounting a helically-threaded spring thereon, the thread on the spring holder having a tension bearing side against which the spring bears when it is in tension and a compression bearing side against which the spring bears when it is in compression, characterized in that the spring holder has a groove formed in a portion of at least one of said sides of its thread over a predetermined circumferential length starting at the end of the thread where the spring engages the spring holder, said groove relieving the spring from restriction against axial movement by said portion of the side, said length being chosen to establish a predetermined ratio of the number of active spring coils in tension to the number of active spring coils in compression.

6. A spring holder as in claim 5 and further including rigid means located at the end of the thread where the spring engages the spring holder, for preventing flexing of said end during maximal elongation of the spring.

7. A spring holder as in claim 5 where the thread on the spring holder abruptly terminates at the end where the spring engages the spring holder, such that the end of the thread has sufficient body to resist flexing during maximal elongation of the spring.

8. A spring holder as in claim 5, 6 or 7 where said groove is formed in the compression bearing side of the thread, the length of said groove being chosen such that the number of active spring coils in tension is equal to the number of active spring coils in compression.

* * * * *